US005124609A

United States Patent [19]

Nagasaka

[11] Patent Number: 5,124,609

[45] Date of Patent: Jun. 23, 1992

[54] COMMUTATOR AND METHOD OF MANUFACTURING THE SAME

[75] Inventor: Mikio Nagasaka, Anjo, Japan

[73] Assignee: Makita Corporation, Aichi, Japan

[21] Appl. No.: 707,042

[22] Filed: May 29, 1991

[30] Foreign Application Priority Data

May 31, 1990 [JP] Japan .................................. 2-142704

[51] Int. Cl.[5] .............................................. H02K 13/04

[52] U.S. Cl. ...................................... 310/233; 310/45; 310/234; 310/235; 310/236

[58] Field of Search ............... 310/233, 234, 235, 236, 310/237, 43, 45, 218, 228, 232, 248; 29/597, 507

[56] References Cited

U.S. PATENT DOCUMENTS

| | | | |
|---|---|---|---|
| 1,476,790 | 12/1923 | Bartmess | 310/233.4 X |
| 2,533,775 | 12/1950 | Durrschmidt | 310/233.4 X |
| 3,290,527 | 12/1966 | Habermann | 310/233.4 X |
| 3,450,914 | 6/1969 | Demerciere | 310/233.4 X |
| 3,619,681 | 11/1971 | Ginkel | 310/232 |
| 4,043,621 | 8/1977 | Heinz | 310/232 |
| 4,566,744 | 1/1986 | Egelenburg | 310/219 |

FOREIGN PATENT DOCUMENTS

| | | | |
|---|---|---|---|
| 1074141 | 1/1960 | Fed. Rep. of Germany | 310/233 |
| 1280908 | 11/1961 | France | 310/233 |
| 0026545 | 2/1983 | Japan | 310/233 |
| 0082967 | 6/1985 | Japan . | |
| 0098139 | 5/1986 | Japan . | |

*Primary Examiner*—R. Skudy

*Attorney, Agent, or Firm*—Dennison, Meserole, Pollack & Scheiner

[57] ABSTRACT

A commutator includes a plurality of commutator segments disposed in circular configuration and equally spaced from each other in a circumferential direction. Each commutator segment has a contact portion for contact with a brush and an anchoring portion which forms a recess in cooperation with the contact portion. A ball made of insulation material is disposed between each two adjacent commutator segments in such a manner that ball is partly engaged with both recesses of adjacent commutator segments. A cylindrical hub made of synthetic resin is molded with the anchoring portions of the commutator segments and the balls.

6 Claims, 3 Drawing Sheets

COMMUTATOR AND METHOD OF MANUFACTURING THE SAME

BACKGROUND OF THE INVENTION

1. Field of the Invention

The present invention relates to a commutator of an electric motor for use with a power driven tool, etc. and a method of manufacturing the same.

2. Description of the Prior Art

In a commutator of an electric motor, it is proposed to provide means for preventing commutator segments from shifting. As disclosed in U.S. Pat. Nos. 2,533,775, 3,290,527 and 3,450,914, such means conventionally include metal rings which are embedded within a hub made of synthetic resin and which are disposed within recesses formed by anchoring portions of the commutator segments.

However, such metal rings require not to be in contact with commutator segments and therefore, it is difficult to manufacture the commutator. Further, since the synthetic resin exists between the metal rings and the commutator segments, the metal rings do not effectively prevent the commutator segments from shifting. Additionally, the metal rings tend to be broken under high temperature caused by commutation sparks.

Japanese Laid-Open Utility Model Publication No. 60-82967 discloses a ring made of ceramic which is embedded within a hub made of synthetic resin and which is positioned within recesses formed by anchoring portions of commutator segments in contacting relationship therewith. Japanese Laid-Open Patent Publication No. 61-98139 discloses a ceramic ring formed integrally with commutator segments.

However, in the former Japanese prior art construction, the ceramic rings tend to be easily broken and to have uneven sizes because of its material and configuration. Therefore, it has been very difficult to assemble the ceramic rings and to thereafter form the hub by injecting synthetic resin thereto. Further, in the latter Japanese prior art construction, the ceramic ring tends to shrink after molding with commutator segments. Therefore, the commutator tends to be easily broken and to have uneven sizes. For this reason, this construction has not been practically employed.

SUMMARY OF THE INVENTION

It is, accordingly, an object of the present invention to provide a commutator including means for preventing shifting of commutator segments which can rigidly secure each of adjacent commutator segments.

It is another object of the present invention to provide a method of manufacturing a commutator which permits easy assembling of the commutator.

According to the present invention, there is disclosed a commutator comprising:

a plurality of commutator segments disposed in circular configuration and spaced from each other in a circumferential direction; each of the commutator segments including a contact portion for contact with a brush and at least one anchoring portion extending radially inwardly from the contact portion and further extending axially of the commutator segments to form a recess in cooperation with the contact portion;

a plurality of balls made of insulation materials each disposed between two adjacent commutator segments in such a manner that each of the balls is partly engaged with both recesses of the two adjacent commutator segments; and a cylindrical hub made of synthetic resin and molded with the anchoring portion of the commutator segments and the balls.

Preferably, the balls may be formed by ceramic and each recess of the commutator segment includes a first surface and a second surface opposed to each other in a radial direction. The first surface is positioned radially outwardly of the second surface. Each ball contacts end portions in a circumferential direction of both first and second surfaces of the recesses of the two adjacent commutator segments.

In another embodiment, a ring made of metal is embedded within the hub adjacent the balls in such a manner that the ring does not contact the commutator segments.

The ring may be positioned radially outwardly of the balls. Each ball contacts the inner surface of the ring and also contacts the end portions in a circumferential direction of the second surfaces of the recesses of the two adjacent commutator segments.

A method of manufacturing a commutator having a plurality of commutator segments each held by a hub made of synthetic resin with balls made of insulating material interposed between the commutator segments, comprising the steps of:

a) forming each commutator segment to have a contact portion for contact with a brush and at least one anchoring portion extending radially inwardly from the contact portion and further extending axially of the commutator segments to form a recess in cooperation with the contact portion;

b) arranging the commutator segments in circular configuration and provisionally keeping the configuration by a holder;

c) forcing the commutator segments into a rigid annular member so as to closely fit thereto;

d) inserting the balls between the recesses of the two adjacent commutator segments;

e) molding the hub integrally with the anchoring portion of the commutator segments and the balls while the commutator segments are kept inserted into the annular member; and f) removing the annular member from the commutator segments.

In case the commutator segments directly contact with each other in the step b), an additional step g) follows after the step f) for cutting off the contacting parts of the adjacent commutator segments so as to form a gap.

In case mica is interposed between the adjacent commutator segments, it is not necessary to add the step f).

In the step d), the balls may be closely fitted between the recesses of the adjacent commutator segments in such a manner that each ball contacts end portions in a circumferential direction of radially opposed surfaces of the recesses of the two adjacent commutator segments.

Alternately, in the step d), a metal ring may be also inserted in engagement with the recesses of the commutator segments in such a manner that it does not contact the commutator segments.

The invention will become more fully apparent from the claims and the description as it proceeds in connection with the drawings.

DETAILED DESCRIPTION OF THE PREFERRED EMBODIMENT

Figure 1:
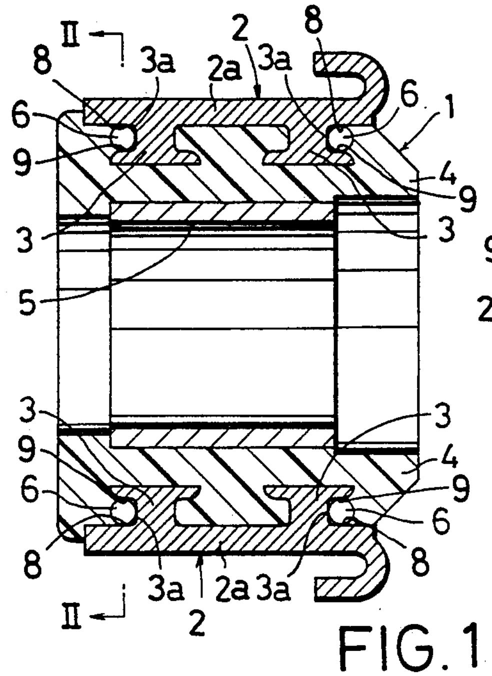
FIG. 1 is a vertical sectional view of a commutator according to a first embodiment of the present invention.
Figure 2:
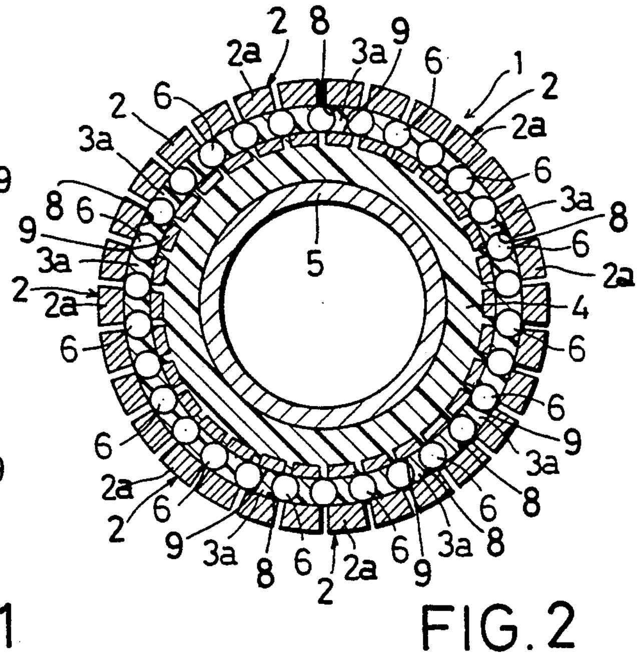
FIG. 2 is a sectional view taken along line II—II in FIG. 1.

Referring to FIGS. 1 and 2, there is shown a commutator 1 according to a first embodiment of the present invention. The commutator 1 includes a plurality of commutator segments 2 circularly arranged and equally spaced from each other at a predetermined distance in a circumferential direction. Each commutator segment 2 includes a contact portion 2*a* for contact with a brush (not shown) and a pair of anchoring portions 3 extending inwardly from the contact portion 2*a* in a radial direction and further extending in an axial direction of the commutator segments 2. The anchoring portions 3 are embedded within a cylindrical hub 4 made of synthetic resin. The hub 4 is molded with the anchoring portions 3. A bush 5 is inserted into the hub 4.

Between each anchoring portion 3 and each contact portion 2*a*, a recess 3*a* is formed for partly receiving a ball 6 made of ceramic. The recess 3*a* includes a first surface 8 and a second surface 9 opposed to each other in the radial direction of the commutator segments 2. The first surface 8 is positioned radially outwardly of the second surface 9. Each ball 6 is engaged between two adjacent commutator segments 2 in such a manner that it contacts end portions in a circumferential direction of both first and second surfaces 8 and 9 of the recesses 3*a* of two adjacent commutator segments 2 each of the balls 6 is engaged in a recess 3*a* and is fixed in position to prevent movement of the two adjacent commutator segments 2 in a radial direction. The balls 6 as well as the anchoring portions 3 are molded with the hub 4.

In the commutator thus constructed, adjacent commutators 2 are securely combined with each other through the balls 6. Further, the balls 6 have large mechanical strength because of their spherical configuration. Therefore, the commutator segments 2 are securely kept by the molded hub 4, so that they are prevented from shifting.

Figure 3:
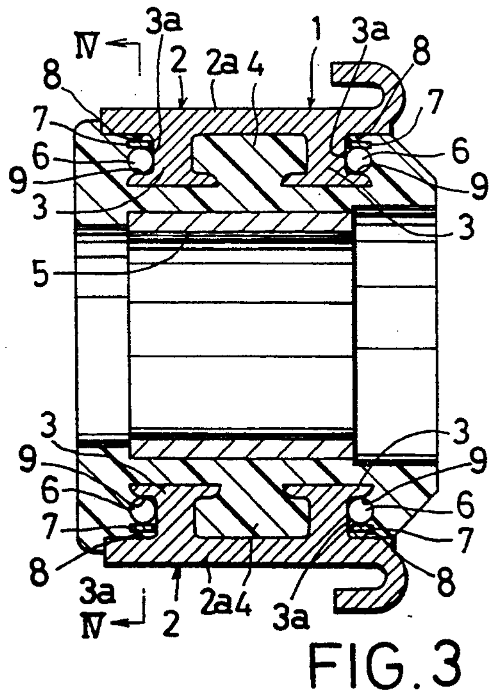
FIG. 3 is a vertical sectional view of a commutator according to a second embodiment of the present invention.
Figure 4:
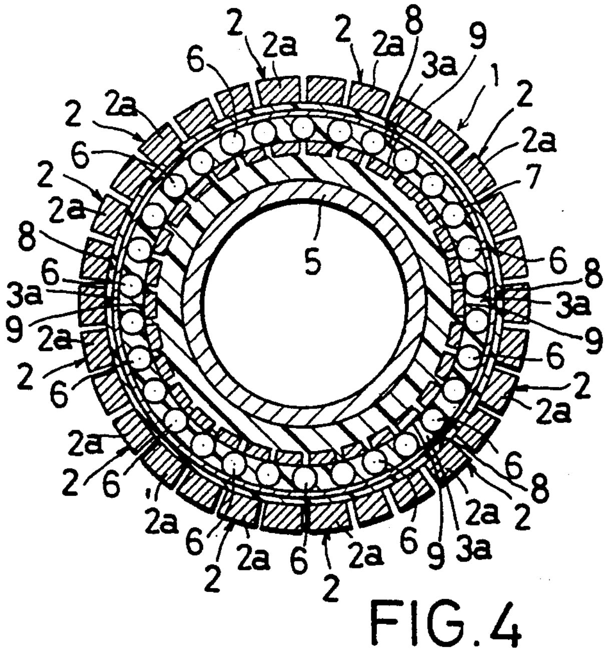
FIG. 4 is a sectional view taken along line IV—IV in FIG. 3.

A second embodiment of the present invention will be hereinafter explained with reference to FIGS. 3 and 4. In these FIGS. 3 and 4, the same elements as shown in FIGS. 1 and 2 are labeled by the same numerals, and an explanation for these elements is omitted.

The commutator 1 of the second embodiment includes rings 7 made of metal. Each ring 7 is inserted within the recesses 3*a* to extend therebetween in such a manner that it does not contact the commutator segments 3. The ring 7 is positioned radially outwardly of the balls 6. Each ball 6 contacts the inner surface of the ring 7 and also contacts the end portions in a circumferential direction of the second surfaces 9 of the recesses 3*a* of two adjacent commutator segements 2. The rings 7 can be easily assembled not to contact the commutator segments 2 as will be hereinafter explained.

Methods of manufacturing commutators 1 of the above embodiments will be hereinafter explained with reference to FIGS. 5 to 9.

Figure 5:
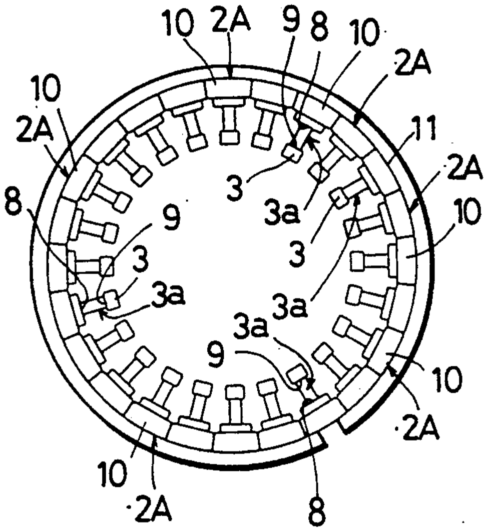
FIGS. 5 to 9 show steps of manufacturing the commutator of the first embodiment of the present invention.
Figure 7:
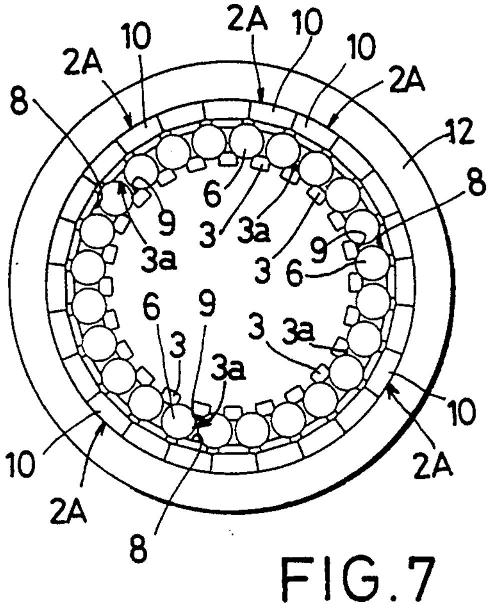
Figure 6:
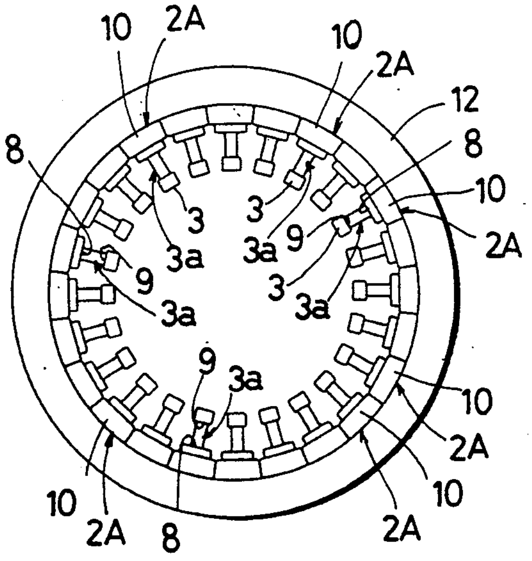
Figure 8:
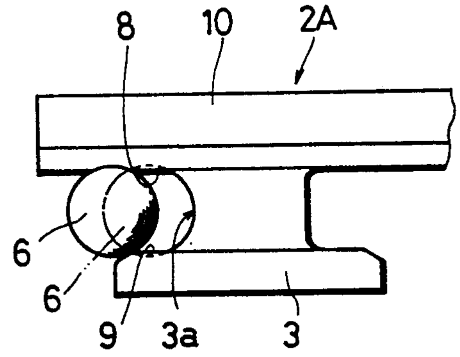
Figure 9:
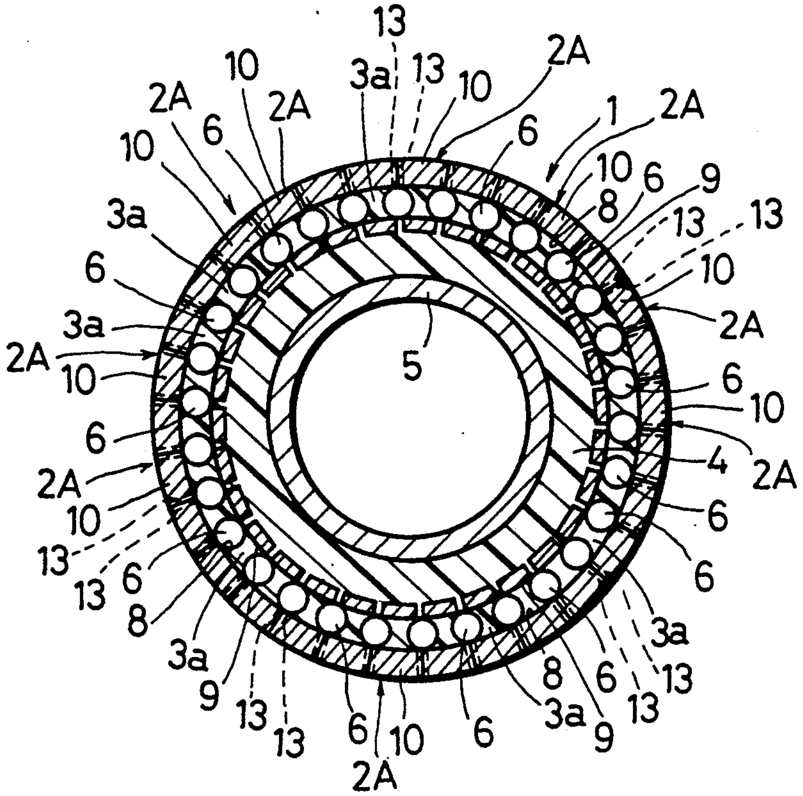

The method of manufacturing the commutator of the fist embodiment includes the following steps:

(a) forming commutator segments 2A which have the same construction as the commutator segments 2 but which include contact portions 10 having broader width in a circumferential direction than that of the contact portions 2*a* of the commutator segments 2, so that the contact portions 10 contact with each other to form a circular configuration (see FIG. 5);

(b) provisionally holding the circular configuration of the contact portions 10 or commutator segments 2A by a holder such as a band 11 as shown in FIG. 5;

(c) forcing commutator segments 2A held by the band 11 into an annular member 12 made of rigid material such as metal so as to closely fit within the annular member 12, and simultaneously removing the band 11;

(d) inserting the balls 6 between the recesses 3*a* of two adjacent commutator segments 2A and provisionally keep their position through the engagement of the balls 6 with end portions in a circumferential direction of both first and second surfaces 8 and 9 of the recesses 3*a* of each two adjacent commutator segments 2A as shown in FIGS. 7 and 8;

(e) forcing the balls 6 in an axial direction of the commutator segments 2A deeper into the recesses 3*a* as shown by imagination line in FIG. 8 using an appropriate tool such as a ring; (Such forcing operation can be made simultaneously at both sides for anchoring portions 3 in an axial direction.)

(f) molding by a molding machine (not shown) the hub 4 integrally with the anchoring portions 3 of the commutator segments 2A and the balls 6 as well as the bush 5 while the commutator segments 2A are held by the annular member 12;

(g) removing the annular member 12 from the commutator segments 2A with the molded hub 4; and (h) finishing the outer surfaces of the contact portions 10 of the commutator segments 2A and cutting off contacting parts 13 of adjacent contact portions 10 by a cutter so as to form the commutator segments 2.

In the step (b), the commutator segments 2A may be provisionally held by an appropriate Jig other than the band 11. Further, if the commutator 1 includes mica interposed between the commutator segments 2, it is not necessary to form the commutator segments 2A. Thus, the provisional holding by the band 11 is performed with the mica interposed between the commutator segments 2. In this case, it is not necessary to include the step of cutting off the contacting parts 13.

Additionally, a step may be added after the step e) for crimping the ends of the anchoring portions 3 so as to narrow the entrance of the recesses 3*a*, so that the balls 6 can be securely kept in position.

In case of the method of manufacturing the commutator of the second embodiment, the following step (d') is performed in place of the step (d):

(d') inserting the ring 7 into the recesses 3a of the commutator segments 2A to extend therebetween and thereafter inserting the balls 6 between the ring 7 and the second surfaces 9 of the recesses 3a of two adjacent commutator segments 2A in such a manner that the balls 6 are provisionally held in contacting relationship with the inner surface of the ring 7 and the end portions of the second surfaces 9. In this method, it is preferable that the ring 7 is previously formed with a synthetic resin layer made of the same synthetic resin as the hub 4 at one end in an axial direction, so that it is reliably prevented from contacting the commutator segments 2A after it has been inserted within the recesses 3a.

In the above methods, the forcing operation of the balls 6 is made after the commutator segments 2A or the commutator segments 2 have been forced to be fitted within the annular member 12. Therefore, the commutators can be reliably manufactured without breakage of the balls 6.

While the invention has been described with reference to preferred embodiments thereof, it is to be understood that modifications or variations may be easily made without departing from the scope of the present invention which is defined by the appended claims.

What is claimed is:

1. A commutator comprising:

a plurality of commutator segments disposed in circulator configuration and spaced from each other in a circumferential direction, each of said commutator segments including a contact portion for contact with a brush and at least one anchoring portion extending radially inwardly from said contact portion and further extending axially of said commutator segments to form a recess in cooperation with said contact portion;

a plurality of balls made of insulation materials each disposed between two adjacent commutator segments in such a manner that each of said balls is partly engaged with both recesses of said two adjacent commutator segments and is fixed in position so as to prevent movement of said two adjacent commutator segments relative to each other in a radial direction; and a cylindrical hub made of synthetic resin and molded with said anchoring portions of said commutator segments and said balls.

2. The commutator as defined in claim 1 wherein said recess of each of said commutator segments includes a first surface and a second surface opposed to each other in a radial direction, said first surface being positioned radially outwardly of said second surface and wherein each ball contacts end portions in a circumferential direction of both said first and second surfaces of said recesses of said two adjacent commutator segments.

3. The commutator as defined in claim 1 wherein said balls are made of ceramic.

4. The commutator as defined in claim 1 wherein a ring is embedded within said hub adjacent said balls in such a manner that said ring does not contact said commutator segments.

5. The commutator as defined in claim 4 wherein said ring is positioned radially outwardly of said balls, said recess of each commutator segments includes a first surface and a second surface opposed to each other in a radial direction, said first surface being positioned radially outwardly of said second surface and wherein each ball contacts inner surface of said ring and also contacts end portions in a circumferential direction of said second surfaces of said recesses of said two adjacent commutator segments.

6. The commutator as defined in claim 4 wherein said balls are made of ceramic and said ring is made of metal.

* * * * *